United States Patent
Weiland et al.

(10) Patent No.: US 9,809,391 B2
(45) Date of Patent: Nov. 7, 2017

(54) METHOD AND UNIT FOR CONVEYING LOAD CARRIERS

(71) Applicant: EISENMANN SE, Boeblingen (DE)

(72) Inventors: Ralf Weiland, Dettenhausen (DE); Klaus Gawelczyk, Stuttgart (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/913,820

(22) PCT Filed: Jul. 30, 2014

(86) PCT No.: PCT/EP2014/002087
§ 371 (c)(1),
(2) Date: Feb. 23, 2016

(87) PCT Pub. No.: WO2015/024624
PCT Pub. Date: Feb. 26, 2015

(65) Prior Publication Data
US 2016/0207714 A1    Jul. 21, 2016

(30) Foreign Application Priority Data
Aug. 23, 2013 (DE) .......... 10 2013 014 102

(51) Int. Cl.
*B65G 1/04* (2006.01)
*B65G 35/06* (2006.01)
*B65G 17/12* (2006.01)
*B65G 37/00* (2006.01)
*B65G 1/06* (2006.01)
*B65G 63/00* (2006.01)

(52) U.S. Cl.
CPC .......... *B65G 37/00* (2013.01); *B65G 1/0414* (2013.01); *B65G 1/065* (2013.01); *B65G 63/002* (2013.01)

(58) Field of Classification Search
CPC ... B65G 1/02; B65G 1/04; B65G 1/06; B65G 1/065; B65G 1/026; B65G 1/0492; B65G 35/06; B65G 17/12; B65G 2201/0258; B61B 13/04; B61B 13/06; B61B 13/003
USPC .............. 198/347.1, 347.4, 580, 465.2, 435; 414/276, 279, 284, 286
See application file for complete search history.

(56) References Cited

U.S. PATENT DOCUMENTS 3,973,685 A * 8/1976 Loomer ................. B65G 1/065
                                                    414/284
4,459,078 A   7/1984 Chiantella et al.
(Continued)

FOREIGN PATENT DOCUMENTS

DE   102 34 310 A1   2/2004
EP   2 452 899 A1    5/2012
(Continued)

*Primary Examiner* — James R Bidwell (57) ABSTRACT

In a method for conveying laden or unladen load carriers, the load carriers are conveyed by a first conveying system and a second conveying system which differ from one another in conveying terms. At least one load carrier is picked up and conveyed, at least temporarily, by in each case one conveying device of the first conveying system independently of the second conveying system. The second conveying system at least temporarily conveys a conveying device or an assembly which is formed by a conveying device and at least one load carrier brought together with the latter. A unit for this purpose is also specified.

14 Claims, 7 Drawing Sheets

(56) References Cited

U.S. PATENT DOCUMENTS

| | | | | |
|---|---|---|---|---|
| 5,174,707 | A * | 12/1992 | Suekane | A62C 3/00 414/282 |
| 5,379,229 | A * | 1/1995 | Parsons | B65G 1/1378 414/273 |
| 6,042,321 | A | 3/2000 | Labell | |
| 6,213,025 | B1 | 4/2001 | Sauerwein et al. | |
| 6,652,213 | B1 * | 11/2003 | Mitchell | B65G 1/0492 414/279 |
| 8,616,822 | B2 * | 12/2013 | Winkler | A47F 10/00 211/151 |
| 9,022,204 | B2 * | 5/2015 | Wang | B65G 47/643 198/435 |
| 9,334,114 | B2 * | 5/2016 | Salichs | B65G 1/026 |

FOREIGN PATENT DOCUMENTS

| | | | |
|---|---|---|---|
| GB | 2 094 770 | A | 9/1982 |
| WO | 2008/136659 | A1 | 11/2008 |
| WO | 2013/044895 | A1 | 4/2013 |

\* cited by examiner

METHOD AND UNIT FOR CONVEYING LOAD CARRIERS

RELATED APPLICATIONS

This application is a national phase of International Patent Application No. PCT/EP2014/002087, filed Jul. 30, 2014, which claims the filing benefit of German Patent Application No. 10 2013 014 102.8, filed Aug. 23, 2013, the contents of both of which are incorporated herein by reference.

FIELD OF THE INVENTION

The invention relates to a method for conveying laden or unladen load carriers, in which the load carriers are conveyed by a first conveyor system and a second conveyor system which differ from one another in conveying terms.

The invention moreover relates to an installation for conveying laden or unladen load carriers, having a first conveyor system and a second conveyor system which differ from one another in conveying terms.

BACKGROUND OF THE INVENTION

The term load carriers below can refer to both laden load carriers and empty load carriers.

Conveyor installations frequently have a plurality of operating zones which are linked to one another in conveying terms and in which material to be conveyed and the conveying paths thereof are managed with different objectives.

The operating zones can be work stations in which the material to be conveyed is treated or processed. In particular, however, operating zones can be different logistics zones of a logistics system in which material to be conveyed is picked.

A first logistics zone is then, for example, an inbound delivery zone in which material to be conveyed is delivered. The material to be conveyed is located here on load carriers, such as are known for example in the form of pallets. Euro pallets have become particularly well-established as load carriers.

The material to be conveyed is then conveyed on the load carrier to further logistics zones, such as a storage zone or an order picking zone or the like, and from there to an outbound delivery zone. Between inbound delivery zone and outbound delivery zone, the material to be conveyed can cross only a single logistics zone of this type, although it can also pass through a plurality of different logistics zones. For example, material to be conveyed can be moved directly from the inbound delivery zone to an order picking zone and from there to an outbound delivery zone. However, the material to be conveyed can also firstly be conveyed to a storage zone, be stored temporarily there and then arrive at the outbound delivery zone via the order picking zone at a later time.

Conveyor systems, which differ in conveying terms and which operate in some cases manually and in some cases automatically, can be established in all logistics zones present depending on the operating concept of the particular zone. The term manual conveyor system is used here to refer to all conveyor systems in which an operator carries out the essential conveying steps. For example, a motor-driven but human-controlled forklift therefore also counts as a manual conveyor system.

In the inbound delivery zone mentioned, the forklift system is for example a first conveyor system. Overhead track systems can be effective, for example, as a second conveyor system in a storage zone, whilst a floor-guided conveyor system is preferably used as a further conveyor system in an order picking zone in which order pickers have to access conveyed objects. It is also possible for different conveyor systems to be present within individual logistics zones.

Between two conveyor systems which differ in conveying terms, there is always a handover station in which the load carriers are then transferred with the material to be conveyed from one conveyor system to another conveyor system. To this end, either stationary automatic transfer systems are present in a handover station of this type, or the material to be conveyed is transferred manually by personnel on site, for which the corresponding equipment and personnel have to be available in the handover station. Even the case where only one logistics zone, for example an order picking zone, is passed through between the inbound delivery zone and the outbound delivery zone, two handover stations are required. All in all, this results in a relatively high expenditure on materials and possibly personnel.

SUMMARY OF THE INVENTION

It is therefore an object of the invention to provide a method and an installation of the type mentioned at the outset which take these considerations into account.

This object may be achieved in a method of the type mentioned at the outset in that a) at least one load carrier is received and conveyed at least temporarily by in each case one conveyor device of the first conveyor system, independently of the second conveyor system;
and b) a conveyor device or an assembly, which is formed by a conveyor device and at least one load carrier which is brought together with this conveyor device, is conveyed at least temporarily by the second conveyor system.

According to the invention, one conveyor system is therefore used on the one hand as an independent conveyor system with which the laden or unladen load carriers can be conveyed; to this end, this conveyor system comprises corresponding conveyor devices. On the other hand, a conveyor device of this type, together with a received load carrier, can be conveyed along, virtually "piggyback", by the second conveyor system. The first conveyor system with the conveyor devices therefore operates across conveyor systems. In this case, a conveyor device which is already located on the second conveyor system can part with the load carrier there and be conveyed separately or move independently. As mentioned, the load carriers can be laden or unladen, that is to say an empty load carrier on a conveyor device is also regarded as an assembly.

The conveyor devices of the first conveyor system can also take over the handover to the second conveyor system in this way. If there are a plurality of handover regions between two conveyor systems, all system handovers can take place by means of the first conveyor system. However, it goes without saying that it is also possible to use known handover methods, which are then supplemented by the method described here.

It is particularly favourable if at least one assembly is conveyed at least temporarily by a further conveyor system, which differs from the second conveyor system in conveying terms. Therefore, if a plurality of different conveyor systems are present as described above, an assembly which is formed by a conveyor device and at least one load carrier can therefore be conveyed from both logistics zones. The handover of the load carrier from one conveyor system to the other conveyor system can then take place again by means of by the conveyor device, i.e. the assembly moves as a whole from the one conveyor system to the other conveyor system.

This is particularly favourable if the second conveyor system is operated in one or more operating zones and the third conveyor system is operated in another operating zone. In this case, the first conveyor system with the conveyor devices is therefore operated across zones and can replace all normally required handover stations.

According to the invention, at least two cooperating conveyor units are preferably used as the conveyor device of the first conveyor system, each of which conveyor units
a) comprises a chassis which can be moved on floor rollers;
b) comprises a supporting element which is carried along by the chassis and can be lifted or lowered in relation to the chassis in such a way that, in an empty configuration, the conveyor unit can move under a load carrier and, in a conveying configuration, can receive and convey a load carrier by means of the supporting element;
c) comprises a drive system by means of which at least one of the floor rollers can be driven.

Conveyor skids are particularly used as conveyor units.

With reference to the installation of the type mentioned at the outset, the object described above may be achieved in that
a) the first conveyor system comprises a plurality of conveyor devices;
b) at least one load carrier in each case can be received and conveyed independently of the second conveyor system by the conveyor devices;
c) an assembly, which can be conveyed by the second conveyor system, is formed by in each case one conveyor device and at least one load carrier which is received by this conveyor device.

The advantages of this and of the features below correspond essentially to the advantages explained above in relation to the method.

It is therefore favourable if at least one further conveyor system is present, which differs from the second conveyor system in conveying terms and by means of which at least one assembly can likewise be conveyed.

The second conveyor system is preferably arranged in one of a plurality of operating zones and the third conveyor system is preferably arranged in a second operating zone.

According to the invention, a conveyor device of the first conveyor system comprises at least two cooperating conveyor units, each of which
a) comprises a chassis which can be moved on floor rollers;
b) comprises a supporting element which is carried along by the chassis and can be lifted or lowered in relation to the chassis in such a way that, in an empty configuration, the conveyor unit can move under a load carrier and, in a conveying configuration, can receive and convey a load carrier by means of the supporting element;
c) comprises a drive system by means of which at least one of the floor rollers can be driven.

In this arrangement, the conveyor units are preferably constructed as conveyor skids.

The conveyor systems can cooperate particularly effectively if the second and/or the third conveyor system is an overhead track system or a lift system. However, it is also possible to use ropebelt, belt or chain conveyors for the second and/or third conveyor system.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawings, which show:

FIG. 1a perspective view of a conveyor system for conveying load carriers, in which two skid-like conveyor units, which can be moved independently of one another, form a conveyor device;

FIG. 2a perspective view, corresponding to FIG. 1, of the conveyor system in which a load carrier is moreover shown in the form of a pallet;

FIG. 3a side view of a conveyor unit in a partial phantom view to show a chassis and a drive system;

FIG. 4a view from above in a partial phantom view of a conveyor unit in a linear travel configuration;

FIG. 5a view from above in a partial phantom view of a conveyor unit in a curved travel configuration;

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIGS. 1 to 4, 10 denotes a first conveyor system as a whole, by means of which laden or unladen load carriers 12 can be conveyed. Pallets, such as are known per se, are shown as an example of load carriers 12 in FIG. 2 and also in FIGS. 6 to 11.

A load carrier 12 has a supporting surface 12a on which material to be conveyed 14 is deposited and fastened, as shown in FIGS. 6 to 11. The supporting surface 12a rests on a floor 16 by way of bearing elements 12b. A respective opening 12c remains between two adjacent bearing elements 12b and is open downwards towards the floor 16 and at both end faces. In particular, a load carrier 12 of this type can be constructed as a so-called Euro pallet.

Figure 1:
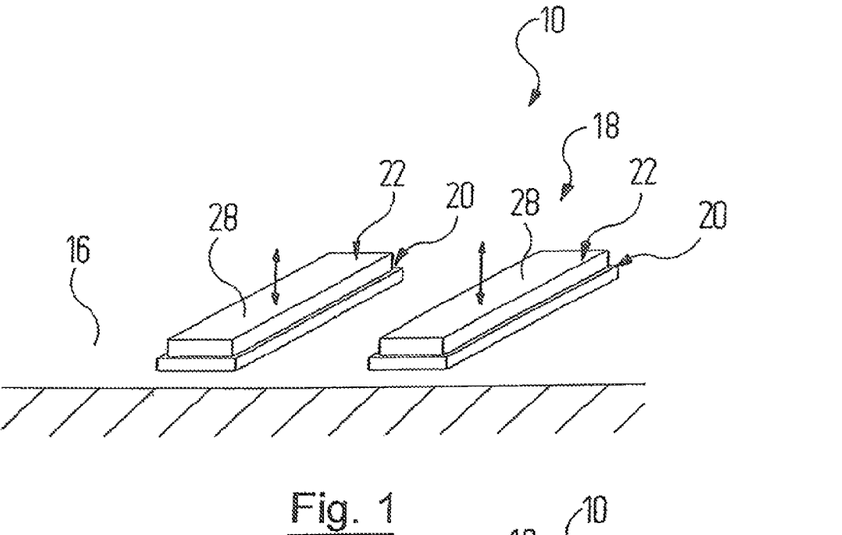
Figure 2:
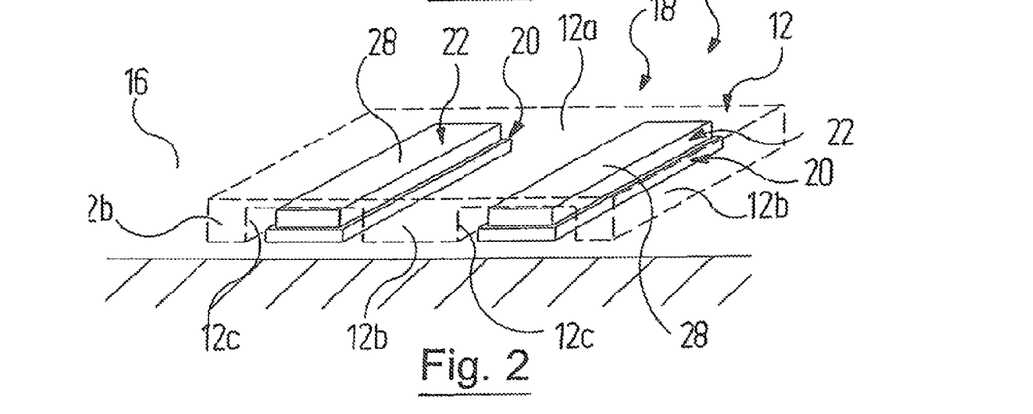

The conveyor system 10 comprises a plurality of conveyor devices 18 which can be moved on the floor 16 and of which one is shown in each case in FIGS. 1 and 2. A conveyor device 18 is in turn formed by two conveyor units 20. In the present exemplary embodiment, the conveyor units 20 are constructed as conveyor skids 22. These can have an outer contour, for example, which corresponds approximately to that of a fork of a forklift.

These conveyor units 20 communicate in a manner known per se with a central control (not shown specifically) which coordinates the conveying process.

Figure 3:
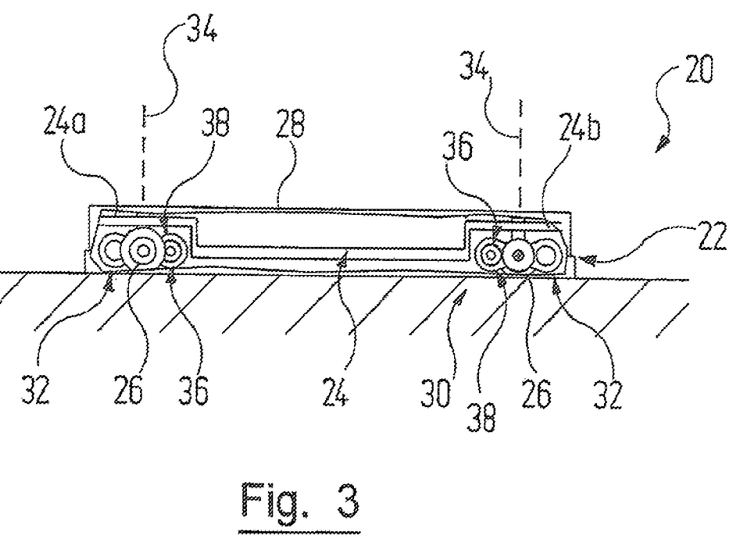
Figure 4:
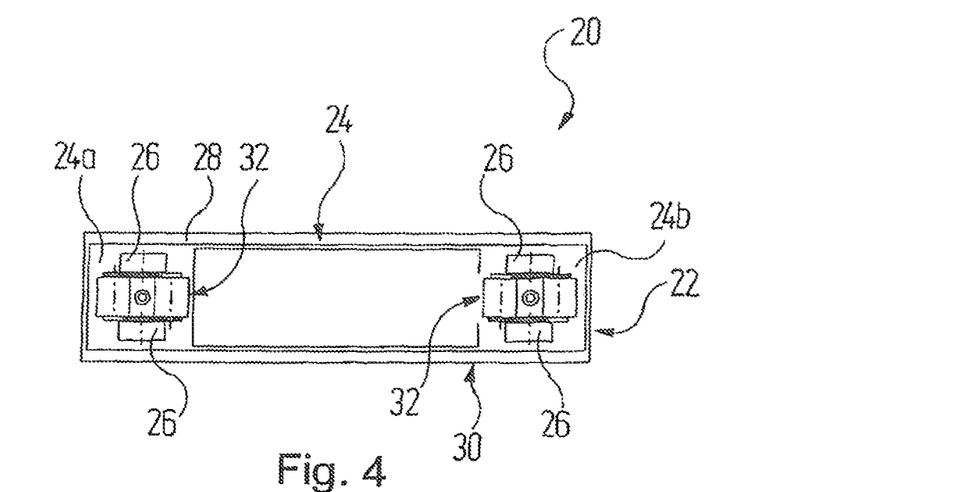
Figure 5:
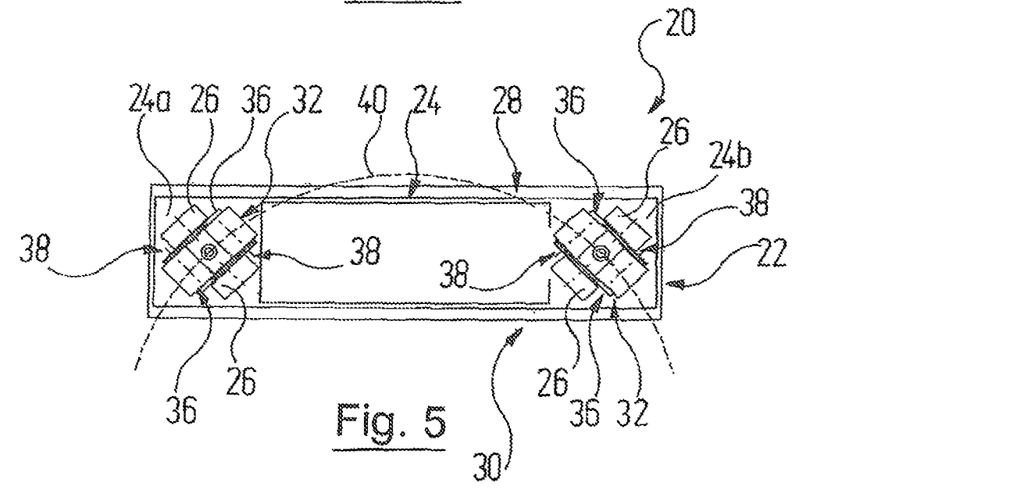

In FIGS. 3 to 5, one of the conveyor units 20 of the conveyor device 18 is now shown separately. The conveyor unit 20 comprises a chassis 24 which can be moved on floor rollers 26 and defines two end regions 24*a*, 24*b*.

The chassis 24 moreover carries along a supporting element 28, which can be lifted or lowered in relation to the chassis 24; this is merely represented in FIG. 1 by double-headed arrows. If the supporting element 28 assumes a lowered position, the conveyor unit 20 is in an empty configuration in which it can move under the load carrier 12. To this end, the conveyor unit 20 is matched to load carriers 12 to be conveyed in terms of its outer contour. In the case of a pallet, this means that, in its empty configuration, the dimensions of the conveyor unit 20 are such that it can move into one of the openings 12*c* of the pallet so that the conveyor unit 20 is located in this opening 12*c* under the supporting surface 12*a* of the pallet.

Conversely, the load carrier 12 also has to be adapted to the conveyor units 20 and provide at least two such openings 12*c*.

The supporting element 28 of a conveyor unit 20 is then lifted in relation to the chassis 24. If the supporting element 28 assumes a lifted position, the conveyor unit 20 is in a conveying configuration in which it can receive and convey a load carrier 12 by means of its supporting element 28.

In a conveyor device 18 comprising two conveyor units 20, the two conveyor units 20 move next to one another in coordinated manner into the adjacent openings 12*c* in the load carrier 12, as shown in FIG. 2. The supporting elements 28 of the two conveyor units 20 are then lifted in synchronised manner so that the load carrier 12 is lifted as a whole, and optionally with the material to be conveyed 14 placed on it. The load carrier 12 can then be conveyed to another location with the aid of the conveyor device 18.

The matching and possible synchronisation of the control procedures for the conveyor units 20 and their movements can be coordinated by way of the central control mentioned and, alternatively or additionally, with the aid of on-board controls (not shown specifically) of the conveyor units 20.

Each conveyor unit 20 comprises a drive system 30 by means of which the floor rollers 26 and the supporting element 28 can be driven.

To this end, the chassis 24 supports a respective drive assembly 32 at its two end regions 24*a*, 24*b*, which is mounted such that it is rotatable about an axis of rotation 34. The axes of rotation 34 are only shown in FIG. 3 and extend vertically when the conveyor unit 20 rests on the floor 16 with the floor rollers 26.

The drive assemblies 32 each carry a respective electric motor 36 for each floor roller 26, each of which is in geared connection with the associated drivable floor roller 26, or the bearing axis thereof, by way of gear means 38. In a modification which is not shown specifically, the floor rollers 26 can also be driven without interconnected gear means 38.

The conveyor units 20 are now moved in that the electric motors 36 are supplied with current in mutually co-ordinated manner, as a result of which each floor roller 26 can be driven specifically and individually in a particular direction of rotation and at a particular speed.

If all four floor rollers 26 of a conveyor unit 20 are aligned transversely to the longitudinal direction of the conveyor unit 20 and all four electric motors 36 are controlled identically, the conveyor unit 20 assumes a linear travel configuration and drives straight ahead; this is shown by way of example in FIG. 4.

For curved travel, the alignment of the axes of the floor rollers 26 has to be altered in relation to the longitudinal direction of the conveyor units 20. To this end, the two floor rollers 26 of a drive assembly 32 can be driven in opposite directions or at a different speed, as a result of which the drive assembly 32 with the floor rollers 26 rotates about the axis of rotation 34. The conveyor unit can therefore assume the curved travel configuration shown in FIG. 5, for example, and drive through a circular curve 40 indicated therein if the drive assemblies 32 are aligned so that the axes of the floor rollers 26 are perpendicular to the circular curve 40 to be followed. In the case of a conveyor device 18 with two conveyor units 20, a pallet 14 can then be rotated on the spot, for example, if all drive assemblies 32 are aligned on one and the same circle in this way.

For curved travel, the control takes into account the different paths of the radially outer floor rollers 26 (relative to the curve) with respect to the radially inner floor rollers 26. By altering the speeds of the different floor rollers 26, it is also possible to adapt the direction and the radius of the curves whilst travelling, so that it is possible to specify different travel paths.

A type of parallel displacement of a load carrier 12 can take place for example if the drive assemblies 32 of both conveyor units 20 of a conveyor device 18 are initially rotated in the same direction of rotation and through the same rotational angle about the axis of rotation 34 and the floor rollers 26 are then all driven synchronously and identically.

The lifting and lowering of the supporting element 28 can be enabled for example in that the supporting element 28 is coupled to the drive assemblies 32 by way of a respective screw drive. The drive assemblies 32 can be rotated on the spot about the axis for rotation 34, which then effects a lifting or lowering of the supporting element 28 depending on the direction of rotation.

Figure 6:
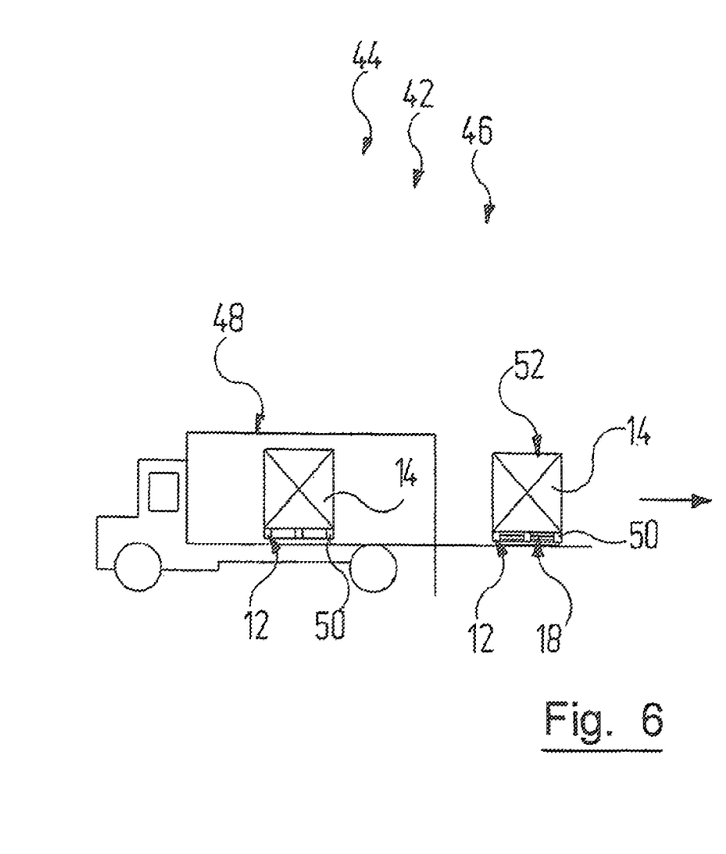
FIG. 6 an inbound delivery zone of a logistics system.

FIG. 6 shows an inbound delivery zone 46 as an example of a first operating zone 42 of a logistics system which is denoted as a whole by 44.

In this, material to be conveyed 14 is delivered on load carriers 12 in the form of so-called Euro pallets 50 by lorries 48, with lorries 48 merely being used as an example to represent any means of transportation. The conveyor skids 22 of the conveyor devices 20 of the first conveyor system 10 can move under the pallets 50 whilst they are still in the lorries 48 and bring them down from the lorries 48. A conveyor unit 20 and a load carrier 12 which is brought together with this thereby form an assembly 52, irrespective of whether or not the load carrier 12 is equipped with material to be conveyed 14. An assembly 52 of this type is again shown separately in FIGS. 6 and 11, in which it is made clear that the conveyor device 18 is part of an assembly 52 of this type. In FIGS. 7 to 11, a respective assembly 52 is otherwise no longer provided with further reference numerals for the sake of clarity.

Figure 7:
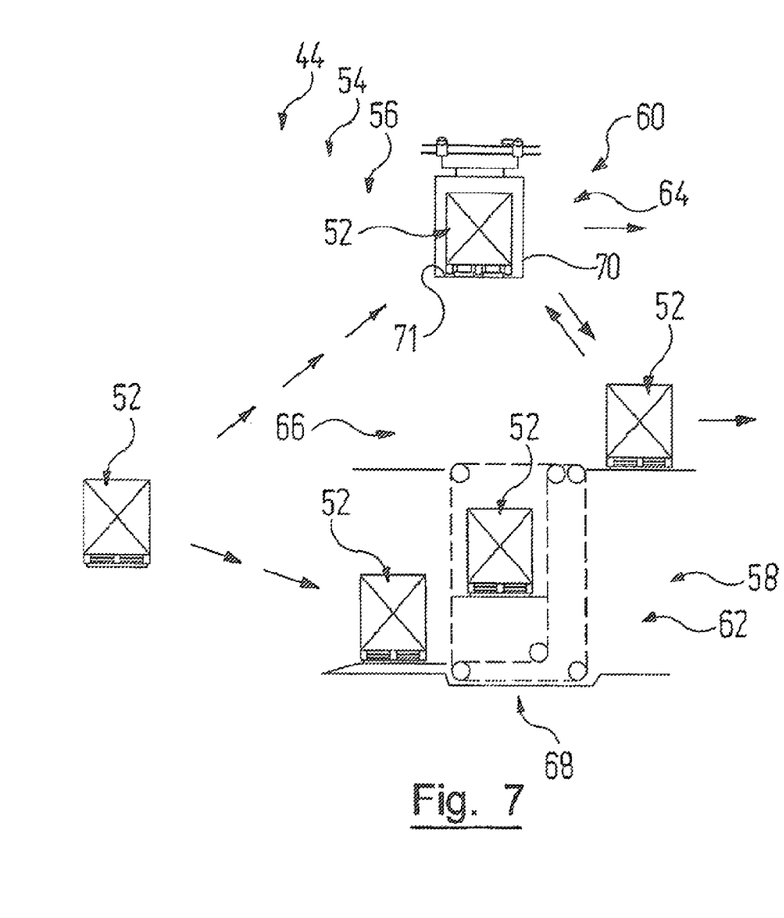
FIG. 7 two internal conveyor systems of the logistics system, shown by way of example.

The conveyor device 18 receives the load carrier 12 in the manner described above and then conveys this as shown by corresponding arrows in FIGS. 6 and 7 from the inbound delivery zone 46 into a second operating zone 54 which is shown in FIG. 7.

The second operating zone 54 in the present exemplary embodiment is a distribution zone 56 in which the material to be conveyed 14 is brought on the pallets 50 to different conveyor systems, i.e. to a second conveyor system 58 or a third conveyor system 60 in the present case, by means of which the material to be conveyed 14 is conveyed to a destination point.

A lift system 62 and an overhead track system 64 are shown in FIG. 7 as examples of a second and a third conveyor system 56, 58. By means of the lift system 62, the material to be conveyed can be conveyed for example to a further operating zone 66 which is located at a different level from the distribution zone 56.

An assembly 52 moves independently into the lift system 62 here and is conveyed by this latter. The lift system 62 here can be constructed as a continuously running, so-called S-conveyor 68, as is known per se. As a result of the conveyor device 18 in the assembly 52, this can move independently into the S-conveyor 68 and out of this again on the upper level, or vice versa.

The precise construction of the overhead track system 64 is not important here; it can refer to any overhead track system for transporting pallets. Interacting with the conveyor devices 18, the overhead track system 64 carries along a hanger 70 which provides a travelling surface 71 for the conveyor devices 18.

As illustrated again by arrows, an assembly 52 can be received directly from the inbound delivery zone 46 by the overhead track system 64 or once the assembly 52 has already been conveyed by the lift system 62.

The levels at which the assemblies 52 are shown in the figures do not correspond to the actual conditions. It goes without saying, for example, that, to receive or hand over an assembly 52, the travelling surface 71 of the hanger 70 has to be located at a level at which the assembly 52 can move directly into or out of the hanger 70 without limitation.

To this end, it is possible to provide various active and/or passive means for altering the level. The alteration can therefore take place in that an assembly 52 which normally moves on a warehouse floor travels over a ramp to a level which enables it to move into the hanger 70. The hanger 70 can alternatively or additionally be lowered from its normal conveying level by altering the rail accordingly or by means of active lifting devices, in which case pits may be required. It is also possible to use smaller lifting platforms for altering the level. The same applies for all other conveyor systems.

Figure 8:
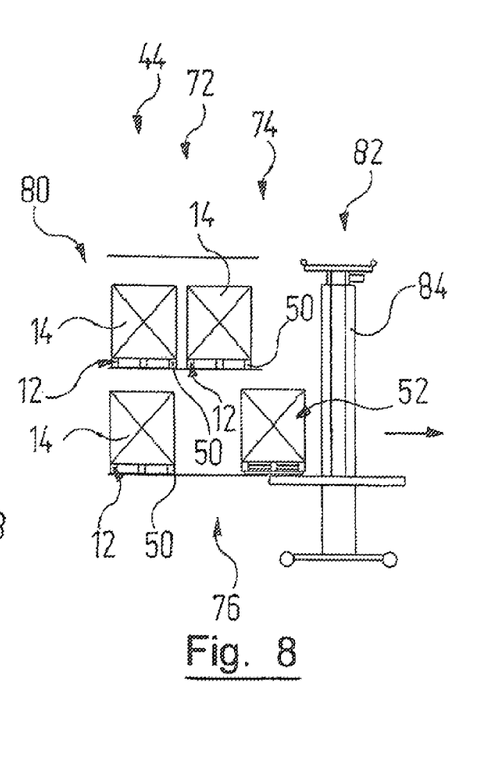
FIG. 8 an entry region of a storage zone of the logistics system.
Figure 9:
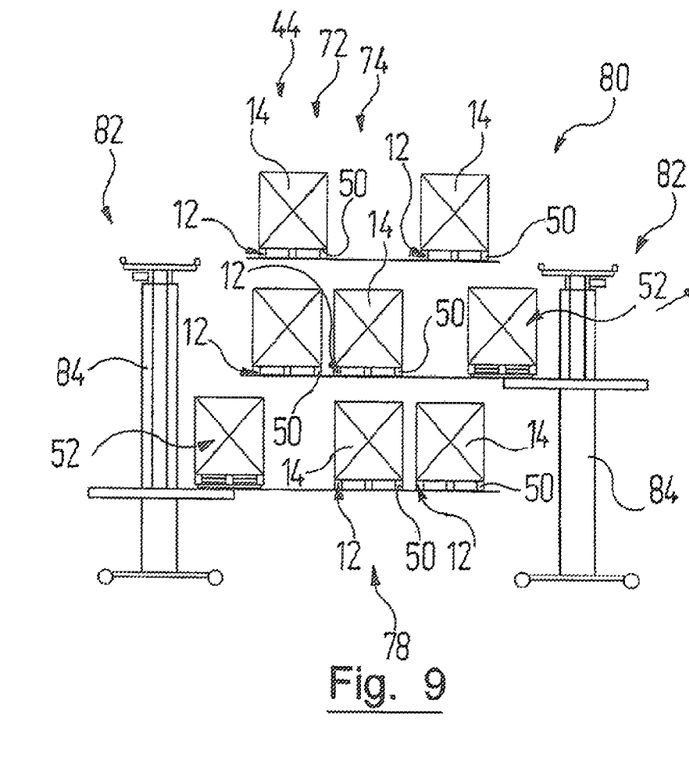
FIG. 9 an exit region of a storage zone of the logistics system.

In FIGS. 8 and 9, a storage zone 74 is shown as a fourth operating zone 72; FIG. 8 shows an entry region 76 and FIG. 9 shows an exit region 78 of the storage zone 74.

The storage zone 74 is conceived for example as a high rack 80 in which movable storage and retrieval systems 84 operate as a fourth conveyor system 82 of the logistics system 44 to move the pallets 50 with the material to be conveyed 14 between different tiers of the high rack 78 and the floor level, as is known per se. A lift system is generally likewise formed by the storage and retrieval systems 84. FIGS. 8 and 9 show three tiers, which are not provided with a specific reference numeral.

The conveyor devices 18 arrive as an assembly 52 in the storage zone 74 and can position the load carriers 12 on a particular storage level. The conveyor devices 18 can then part with the load carriers 12 and either exit the storage zone 74 or, with another load carrier 12, form another assembly 52 which is to be removed from the storage area. Therefore, pallets 50 with material to be conveyed 14, for which no conveyor device 18 of the first conveyor system 10 is allocated, are deposited in the different tiers.

In a storage zone 74 of this type, the conveyor devices 18 can therefore hand over the load carriers 12 with the material to be conveyed 14 to the storage and retrieval systems 84, or accept the load carriers 12 with the material to be conveyed 14 from the storage and retrieval systems 84 and be conveyed along by these latter as an assembly 52.

Figure 10:
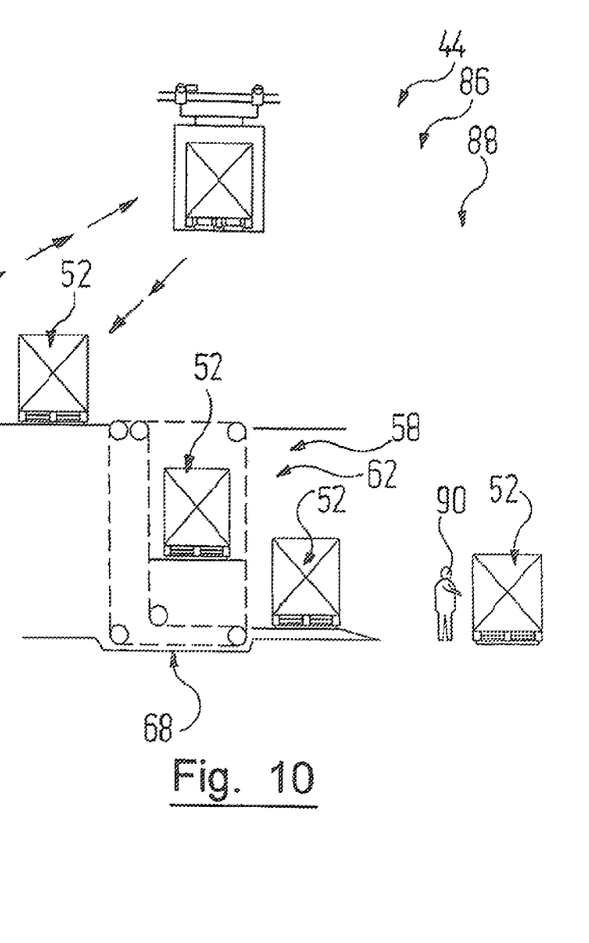
FIG. 10 an order picking zone of the logistics system.

As an example of a fifth operating zone 86 of the logistics system 44, FIG. 10 now shows an order picking zone 88 in which the material to be conveyed 14, which is deposited on the pallets 50, is picked. To this end, the load carriers 12 are conveyed from the exit region 78 of the storage zone 74 into the order picking zone 88, for which the overhead track system 64 is used again, for example. A further S-conveyor 68 is shown again by way of example in the order picking zone 88 itself.

As shown in FIG. 10, an assembly 52 reaches an order picker 90 from the storage zone 74. This means that the conveyor device 18 also has to be conveyed by the overhead track system 64 and the S-conveyor 68 in the region of the order picking zone 88.

Figure 11:
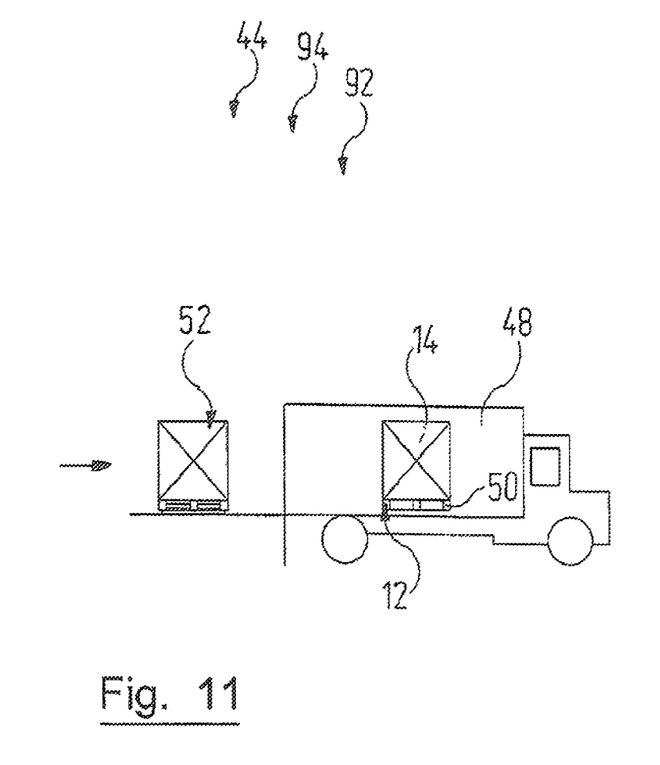
FIG. 11 an outbound delivery zone of the logistics system.

The order picker 90 redistributes material to be conveyed 14 on load carriers 12 which then arrive as an assembly 52 at an outbound delivery zone 92 shown in FIG. 11, which, in the present exemplary embodiment, therefore forms a sixth operating zone 94 of the logistics system 44. The conveyor devices 18 of the first conveyor system 10 themselves serve again as conveying means here; an assembly 52 is not moved by another conveyor system. The conveyor devices 18 can move with the pallet 50 and the material to be conveyed 14 into a lorry 48, deposit the pallet 50 there and move out of the lorry 48, whereupon they can travel back to the logistics system 44 again.

In addition to the lift and overhead track systems 62 and 64 shown, it is alternatively or additionally possible for other conveyor systems to be present, which are well-established in a manner known per se and can convey a conveyor device 18 or an assembly 52 comprising a conveyor device 18 and a load carrier 12. Special mention shall be made here to ropebelt, belt or chain conveyers, by which and on which pallets 50 can be moved. The conveyor devices 18 and assemblies 52 can be moved along by such conveyors.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for conveying laden or unladen load carriers, comprising the steps of:
 conveying load carriers using a first conveyor system and a second conveyor system which differ from one another in conveying terms,
 wherein
 a) at least one load carrier is received and conveyed at least temporarily by, in each case, one conveyor device of the first conveyor system, independently of the second conveyor system;
 b) a third conveyor system separate from the first conveyor system and the second conveyor system, the third conveyor system moving the at least one load carrier from the first conveyor system to the second conveyor system, and further wherein at least two cooperating conveyor units are used as a conveyor device of the first conveyor system, each conveyor unit comprising
 c) a chassis which can be moved on floor rollers;
 d) a supporting element which is carried along by the chassis and can be lifted or lowered in relation to the chassis in such a way that, in a empty configuration, the conveyor unit can move under a load carrier and, in a conveying configuration, can receive and carry a load carrier by means of the supporting element; and e) a drive system by means of which at least one of the floor rollers can be driven.

2. The method according to claim 1, wherein the second conveyor system is operated in one of a plurality of operating zones and the third conveyor system is operated in another operating zone.

3. The method according to claim 1, wherein conveyor skids are used as conveyor units.

4. The method according to claim 1 wherein the second conveyor system is a lift system.

5. The method according to claim 4 wherein the third conveyor system is an overhead track system which conveys the at least one load carrier the second conveyor system receives from the lift system.

6. The method according to claim 1 wherein a conveyor device or an assembly, which is formed by a conveyor device and at least one load carrier which is brought together with this conveyor device, is conveyed at least temporarily by the second conveyor system.

7. The method according to claim 6, wherein at least one assembly is conveyed at least temporarily by the third conveyor system, which differs from the second conveyor system in conveying terms.

8. An installation for conveying laden or unladen load carriers, comprising:
a first conveyor system, and a second conveyor system, and a third conveyor system which differ from each other in conveying terms, wherein
a) the first conveyor system comprises a plurality of conveyor devices;
b) at least one load carrier is received and conveyed by the first conveyor system independently of the second conveyor system by the plurality of conveyor devices;
c) the at least one load carrier is moved from the first conveyor system to the second conveyor system by the third conveyor system further wherein a conveyor device of the first conveyor system comprises at least two cooperating conveyor units, each conveyor unit comprising
d) a chassis which can be moved on floor rollers;
e) a supporting element which is carried along by the chassis and can be lifted or lowered in relation to the chasis in such a way that, in an empty configuration, the conveyor unit can move under a load carrier and, in a conveying configuration, can receive and convey a load carrier by means of the supporting element; and
f) a drive system by means of which at least one of the floor rollers can be driven.

9. The installation according to claim 8, wherein the second conveyor system is arranged in one of a plurality of operating zones and the third conveyor system is arranged in another operating zone.

10. The installation according to claim 8, wherein the conveyor units are constructed as conveyor skids.

11. The installation according to claim 8, wherein the second conveyor system is a lifting device.

12. The installation according to claim 11, wherein the third conveyor system is an overhead track system which conveys the at least one load carrier independent of the first conveyor system after receiving the at least one load carrier from the lifting device.

13. The installation of claim 8, wherein an assembly, which can be conveyed by the second conveyor system, is formed by in each case one conveyor device and at least one load carrier which is received by this conveyor device.

14. The installation of claim 13, wherein the third conveyor system differs from the second conveyor system in conveying terms and by means of which at least one assembly can likewise be conveyed.

* * * * *